United States Patent
Tojo et al.

(10) Patent No.: US 8,284,991 B2
(45) Date of Patent: Oct. 9, 2012

(54) APPARATUS AND METHOD FOR COUNTING NUMBER OF OBJECTS

(75) Inventors: Hiroshi Tojo, Fuchu (JP); Satoshi Yashiro, Yokohama (JP); Muling Guo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 692 days.

(21) Appl. No.: 12/395,060

(22) Filed: Feb. 27, 2009

(65) Prior Publication Data
US 2009/0220123 A1   Sep. 3, 2009

(30) Foreign Application Priority Data
Mar. 3, 2008  (JP) ................................ 2008-052104

(51) Int. Cl.
*G06K 9/00* (2006.01)
(52) U.S. Cl. ...................................................... 382/103
(58) Field of Classification Search .......... 382/100–107; 348/169–174, 154–156; 356/27–31; 73/488–490
See application file for complete search history.

(56) References Cited

U.S. PATENT DOCUMENTS

| | | | | |
|---|---|---|---|---|
| 5,301,239 A | * | 4/1994 | Toyama et al. | 382/104 |
| 2005/0008193 A1 | * | 1/2005 | Toyama | 382/103 |
| 2005/0018879 A1 | * | 1/2005 | Ito et al. | 382/103 |
| 2008/0130948 A1 | * | 6/2008 | Ozer | 382/103 |
| 2008/0247609 A1 | * | 10/2008 | Feris et al. | 382/118 |

FOREIGN PATENT DOCUMENTS

| | | |
|---|---|---|
| JP | 11-282999 A | 10/1999 |
| JP | 2002-074371 A | 3/2002 |
| JP | 2005-92513 A | 4/2005 |
| JP | 2006-031153 A | 2/2006 |

OTHER PUBLICATIONS

Rowley et al, "Neural network-based face detection," IEEE Transactions on Pattern Analysis and Machine Intelligence, vol. 20, No. 1, Jan. 1998.

Yang et al, "Detecting Faces in Images: A Survey," IEEE Transactions on Pattern Analysis and Machine Intelligence,"vol. 24, No. 1, Jan. 2002".

* cited by examiner

*Primary Examiner* — Atiba O Fitzpatrick
(74) *Attorney, Agent, or Firm* — Canon USA Inc IP Division (57) ABSTRACT

An image processing apparatus includes a first detecting unit configured to detect an object based on an upper body of a person and a second detecting unit configured to detect an object based on a face of a person. The image processing apparatus determines a level of congestion of objects contained in an input image, selects the first detecting unit when the level of congestion is low, and selects the second detecting unit when the level of congestion is high. The image processing apparatus counts the number of objects detected by the selected first or second detecting unit from the image. Thus, the image processing apparatus can detect an object and count the number of objects with high precision even when the level of congestion is high and the objects tend to overlap one another.

12 Claims, 7 Drawing Sheets

APPARATUS AND METHOD FOR COUNTING NUMBER OF OBJECTS

BACKGROUND OF THE INVENTION

1. Field of the Invention

The present invention relates to an apparatus and method for counting the number of objects in an image.

2. Description of the Related Art

There is a technique for taking a picture of people passing through an entrance of a store or a passage using a camera, detecting a person from the obtained image, and measuring the number of persons who passed. With this technique, it is known that correctly measuring the number of persons is difficult when the entrance or passage is crowded.

For example, the technique described in Japanese Patent Laid-Open No. 2005-92513 emits slit light from above a passage onto a line in the width direction of the passage, periodically obtains an image above the line, and detects moving objects (persons) from the obtained image. Then, it is determined whether the moving objects are the same person or not using a threshold for the distance between the moving objects, and the number of persons that passed is counted from the determination. At this time, if the level of congestion is low, the directions of the moving objects are not uniform, so some of the moving objects may obliquely pass with respect to the slit light. To address this, a unit configured to determine the level of congestion is provided, and the threshold is changed according to the level of congestion.

Another technique described in Japanese Patent Laid-Open No. 11-282999 periodically obtains an image above the line in the width direction of the passage, detects moving objects from the obtained image, and counts the number of objects, similar to the previously described technique, although not using slit light. At this time, if the level of congestion is high, the moving speed is low, thus resulting in difficulty in the counting. To address this, a unit configured to determine the level of congestion is provided, and a counting process is changed according to the level of congestion. More specifically, for a high level of congestion, because strict counting is difficult, the number of moving objects is counted by division of the total area of all the moving objects by the area of a predetermined standard moving object.

However, if the level of congestion becomes high, in addition to changes in the moving direction and the moving speed, an overlap between moving objects (persons) tends to be large. For example, if people brush shoulders while moving, the two persons are detected as a single moving object (person) with a known technique even when an image is obtained from directly thereabove. If an image is obtained from obliquely thereabove, it is advantageous in that a property, such as the face of a person, can be identified. In this case, however, people tend to overlap one another when the level of congestion is high, so a plurality of persons is still detected as a single object with a known technique. When trying to detect the upper body of a person, as in the upper-body detection described below, for example, if an overlap of people is large, the edges, which feature the upper body, are also hidden, and the upper body may be undetected. Accordingly, even if a threshold or counting process is changed, as in a known technique, when a person in itself is not correctly detected, the counting is not correct.

SUMMARY OF THE INVENTION

The present invention provides detecting of an object with high precision and counting of the number of objects even when the objects tend to overlap one another, such as in crowding.

According to one aspect of the present invention, an image processing apparatus includes a plurality of detecting units, a determining unit, a selecting unit, and a control unit. The plurality of detecting units is configured to detect an object using different detection processes. The determining unit is configured to determine a level of congestion of objects contained in an input image. The selecting unit is configured to select at least one detecting unit from among the plurality of detecting units in accordance with the determined level of congestion. The control unit is configured to cause a result of detection of an object from the input image detected by the at least one selected detecting unit to be output.

According to another aspect of the present invention, an image processing method includes determining a level of congestion of objects contained in an image, selecting a detection process in accordance with the determined level of congestion, and detecting an object from the image using the selected detection process.

Further features of the present invention will become apparent from the following description of exemplary embodiments (with reference to the attached drawings). In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

DESCRIPTION OF THE EMBODIMENTS

An embodiment of the present invention is described below with reference to the accompanying drawings.

Figure 1:
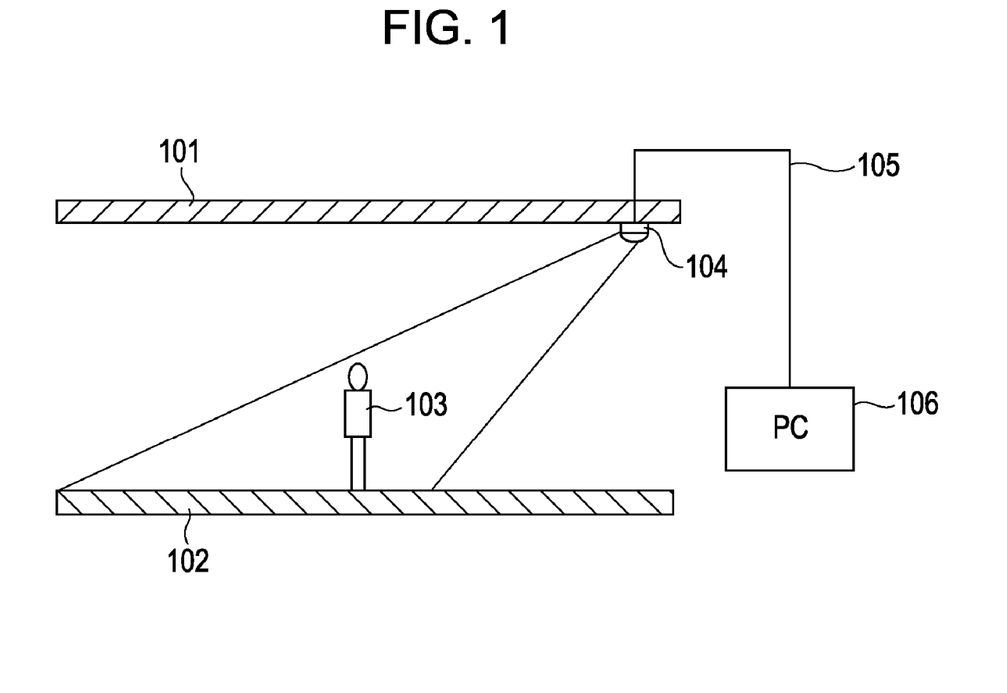
FIG. 1 illustrates an example of a system configuration according to an embodiment of the present invention.

FIG. 1 illustrates an example of a system configuration according to an embodiment of the present invention. An image pickup portion (camera) 104 is placed on a ceiling 101 of a passage so as to be able to obliquely obtain an image of a person 103 who is passing on a floor 102 of the passage. A cable 105, e.g., a local area network (LAN) cable or a coaxial cable, allows an image obtained by the image pickup portion 104 to be transmitted to a personal computer (PC) 106, which is one example of an image processing apparatus or a computer. The PC 106 analyzes an image and performs counting.

Figure 2:
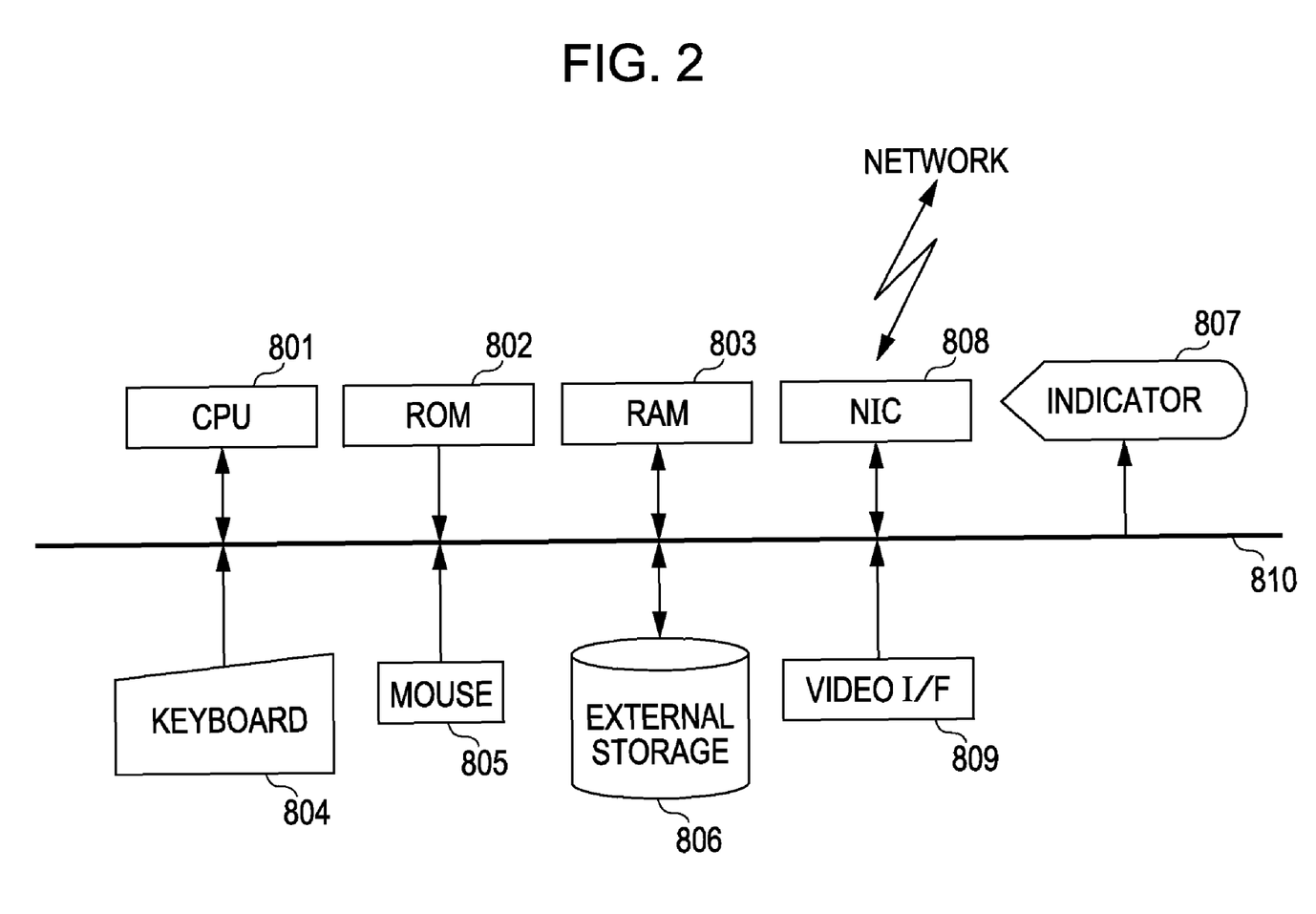
FIG. 2 illustrates an example of a hardware configuration of a personal computer (PC).

FIG. 2 illustrates an example of a hardware configuration of the PC 106. In FIG. 2, a central processing unit (CPU) 801 executes various kinds of control of the PC 106. A read-only memory (ROM) 802 stores a boot program running at the activation of the PC 106 and various kinds of data. A randomaccess memory (RAM) 803 stores a control program to be executed by the CPU 801 and provides a work area for use in the execution of the various kinds of control by the CPU 801. A keyboard 804 and a mouse 805 provide a user with an operational environment for various kinds of inputting.

An external storage 806 can include, for example, a hard disk, an optical disk, a magnetic disk, a magneto-optical disk, and magnetic tape. If the ROM 802 has all of the control programs and various kinds of data, the external storage 806 is not necessarily required. An indicator 807 includes, for example, a liquid crystal screen and displays processing results to a user. A network interface (NIC) 808 enables communication with the image pickup portion 104 on a network through, for example, a LAN cable. A video interface (video I/F) 809 enables a frame image to be captured from the image pickup portion 104 through the cable 105. A bus 810 connects the above-described components with one another.

Figure 3:
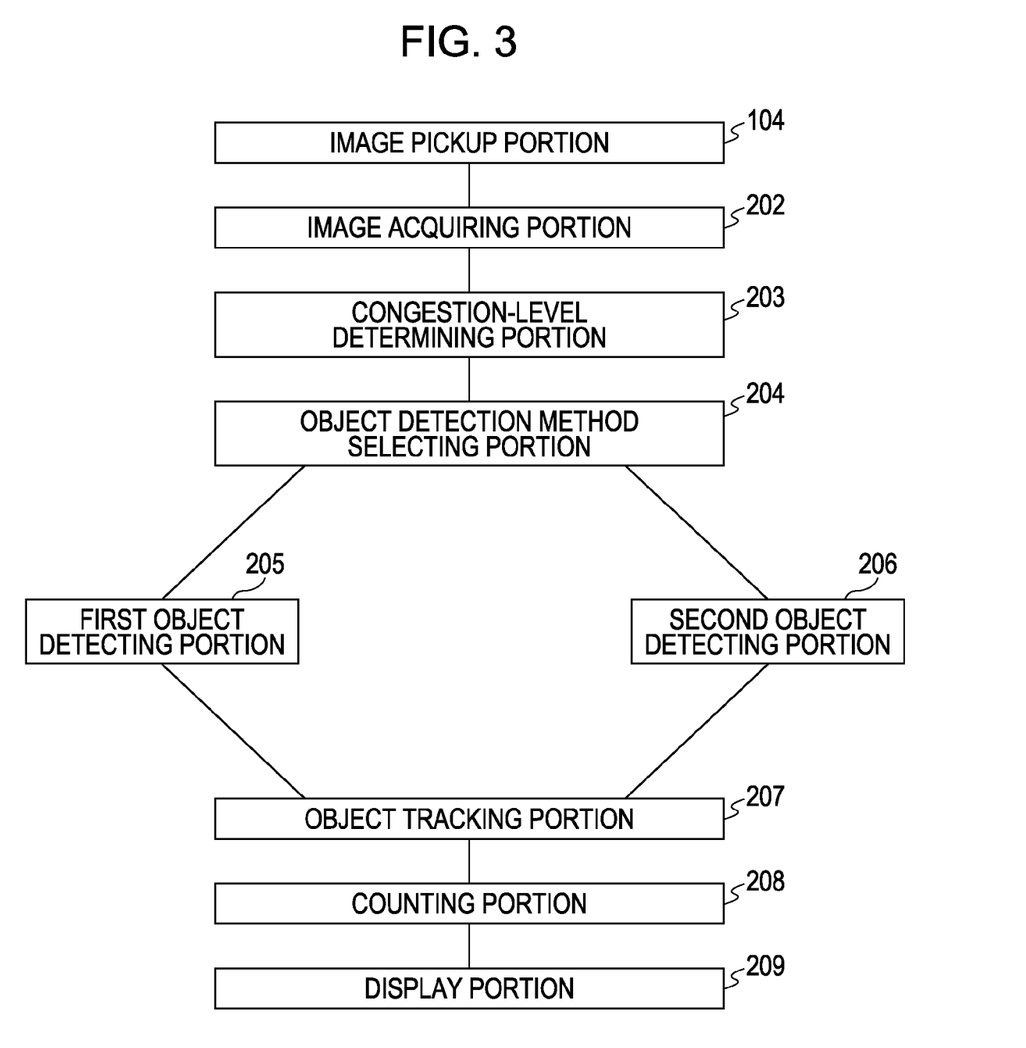
FIG. 3 illustrates an example of a system functional configuration according to an embodiment of the present invention.

FIG. 3 illustrates an example of a system functional configuration according to the embodiment. In FIG. 3, the image pickup portion 104 receives an image.

An image acquiring portion 202 acquires a frame image from the image pickup portion 104. When the cable 105 is composed of a LAN cable, the frame image is transmitted from the image pickup portion 104 through the cable 105 using hypertext transfer protocol (http) packet data and then acquired by the image acquiring portion 202 through the network interface 808 on the PC 106. When the cable 105 is composed of a coaxial cable, the frame image transmitted from the image pickup portion 104 is acquired by the video interface 809 on the PC 106.

A congestion-level determining portion 203 analyzes a frame image acquired from the image acquiring portion 202 and determines the level of congestion.

An object detection method selecting portion 204 selects a method for detecting an object from a frame image in accordance with the level of congestion determined by the congestion-level determining portion 203.

A first object detecting portion 205 detects an object from a frame image using a first method described below.

A second object detecting portion 206 detects an object from a frame image using a second method described below.

An object tracking portion 207 chronologically tracks an object detected by the first object detecting portion 205 or the second object detecting portion 206 selected by the object detection method selecting portion 204 and generates a trail of the same object.

A counting portion 208 counts the number of objects by determining whether an object's trail generated by the object tracking portion 207 satisfies a predetermined condition.

A display portion 209 displays a result from the counting portion 208 on the indicator 807.

Figure 4:
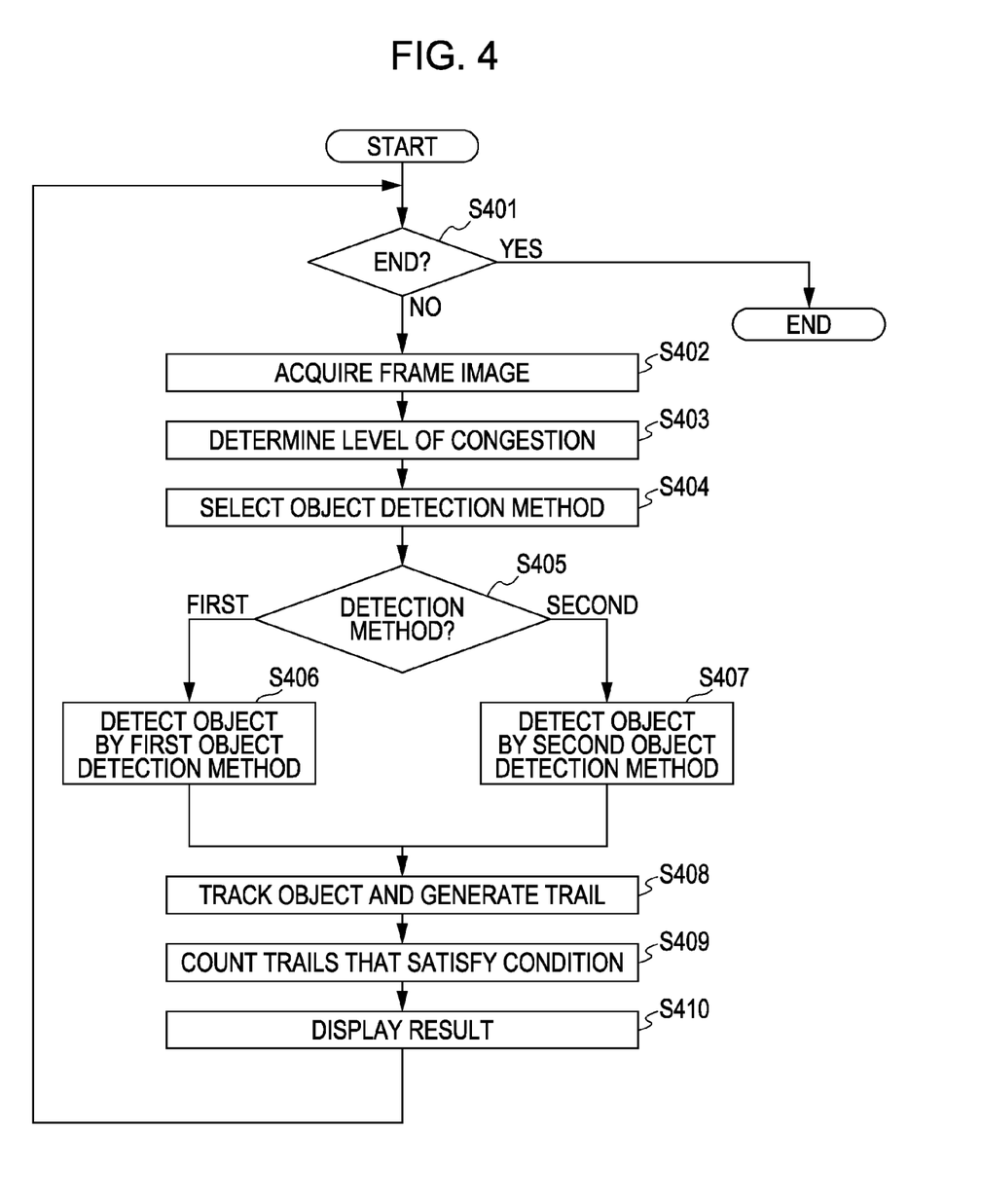
FIG. 4 is a flowchart that illustrates an example of a procedure of detecting an object and counting the number of objects.

FIG. 4 is a flowchart that illustrates an example of a procedure of detecting an object and counting the number of objects.

In step S401, the image acquiring portion 202 determines whether processing is to end, in response to turning off the power or an instruction from a user through the keyboard 804 and/or mouse 805. If it is determined that the processing is to end (YES in step S401), the image acquiring portion 202 ends the processing illustrated in FIG. 4; if it is determined that the processing is not to end (NO in step S401), flow proceeds to step S402.

In step S402, the image acquiring portion 202 acquires a frame image from the image pickup portion 104.

In step S403, the congestion-level determining portion 203 determines the level of congestion from a frame image acquired in step S402. In the present embodiment, the congestion-level determining portion 203 determines the level of congestion to be either "high" or "low." A process for determining the level of congestion will be described in detail below.

In step S404, the object detection method selecting portion 204 selects a first object detection method or a second object detection method in accordance with the level of congestion determined in step S403. As a result of this, it is selected that detection is to be made by the first object detecting portion 205 or the second object detecting portion 206. In the present embodiment, the object detection method selecting portion 204 selects the first object detection method (first object detecting portion 205) for a "low" level of congestion and the second object detection method (second object detecting portion 206) for a "high" level of congestion. That is, the object detection method selecting portion 204 selects the first when the level of congestion is "low" and selects the second when the level of congestion is "high."

In step S405, the object detection method selecting portion 204 confirms a selected detection method. If the selected detection method is the first one (FIRST in step S405), flow proceeds to step S406; if the selected detection method is the second one (SECOND in step S405), flow proceeds to step S407.

In step S406, the first object detecting portion 205 detects an object using the first object detection method. In step S407, the second object detecting portion 206 detects an object using the second object detection method. The detection results are associated with the time code of the detected frame by the first object detecting portion 205 or the second object detecting portion 206 and stored in the RAM 803. A process for detecting an object using the first object detection method and that using the second object detection method are described in detail below.

Figure 5:
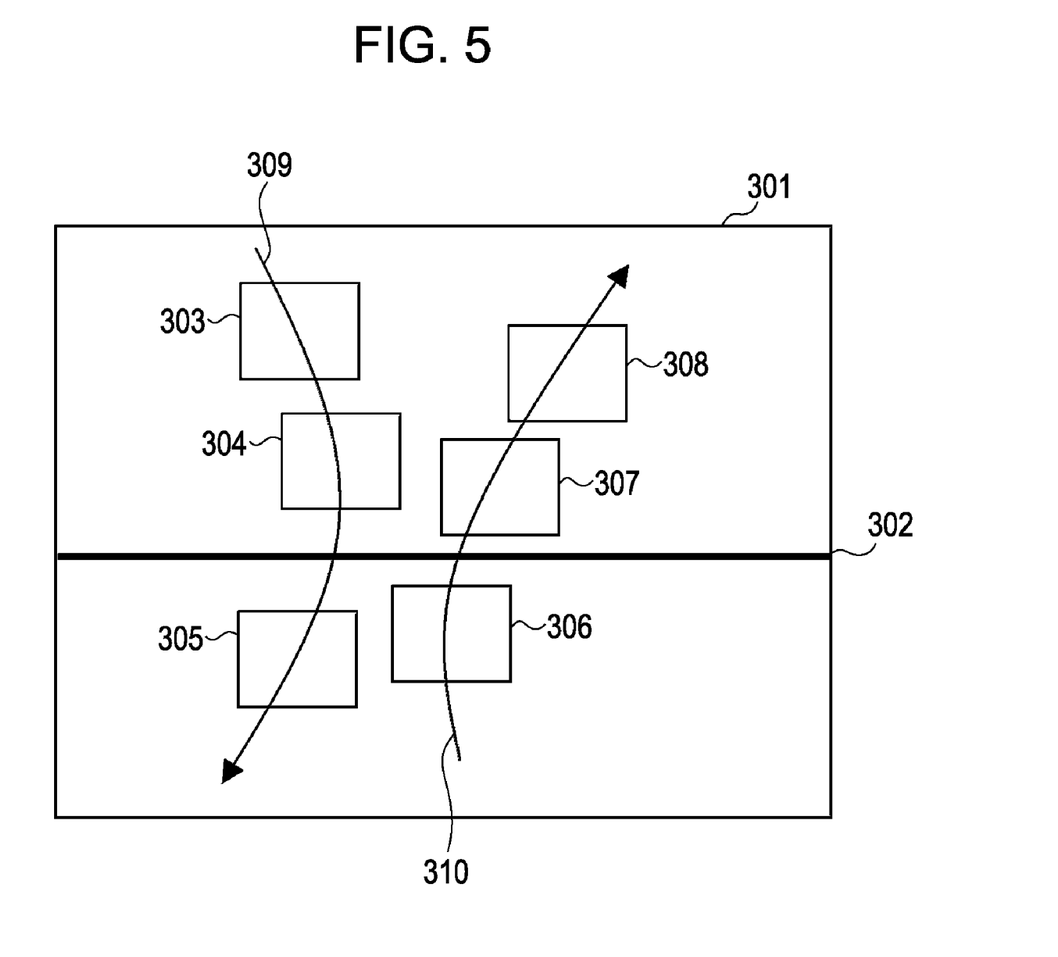
FIG. 5 illustrates generation of a trail.

In step S408, the object tracking portion 207 reads an object region detected for a predetermined period of time to the present time from the RAM 803 and generates a trail. This is the processing of determining movement of the same person among a plurality of objects detected within a predetermined period of time. This process is described in detail with reference to FIG. 5. FIG. 5 is an illustration that describes generation of a trail. In a whole frame 301, the regions of objects detected within a predetermined period of time represented by rectangles are overwritten (303 to 308). In the example illustrated in FIG. 5, the objects for three frames are detected; 303 and 306 are detected in the earliest frame, 304 and 307 are detected in the next frame, and 305 and 308 are detected in the next present frame. One method for finding a trail of the object is to find the center of each of the regions, identify objects having the minimum distance between the centers as the same object, and connect them with a line segment. The trails determined in such a way are two line segments indicated by 309 and 310 in the example illustrated in FIG. 5. That is, the trails of two persons are found. The object tracking portion 207 identifies the trail 309 as corresponding to a person moving toward the camera (hereinafter referred to as in the IN direction) and the trail 310 as corresponding to a person travelling away from the camera (hereinafter referred to as in the OUT direction).

In step S409, the counting portion 208 checks whether the trail generated by the object tracking portion 207 satisfies a predetermined condition. If it satisfies the condition, the counting portion 208 counts it in. One example of the predetermined condition is a condition that an object crosses a measurement line 302 illustrated in FIG. 5. The measurement line 302 is set within a frame screen by a user. In the example illustrated in FIG. 5, the trail 309 crosses the measurement line 302 in the IN direction, and the trail 310 crosses the measurement line 302 in the OUT direction. Thus, the counting portion 208 counts one for IN and one for OUT. If there is a trail that has not yet crossed the measurement line 302, the counting portion 208 does not count it in at this point in time.

In step S410, the display portion 209 displays a result of counting in the counting portion 208, for example, "IN=1, OUT=1" on the indicator 807.

The processing from steps S408 to S410 is not necessarily required to be performed for each frame. If a lag between the present image and a displayed count is allowable by a user, the processing may be performed periodically, for example, for every 0.5 second.

After displaying the result in step S410, processing returns to step S401 and is repeated until it is determined in step S401 that processing is to end.

The process for determining the level of congestion is described in detail below.

Figure 6:
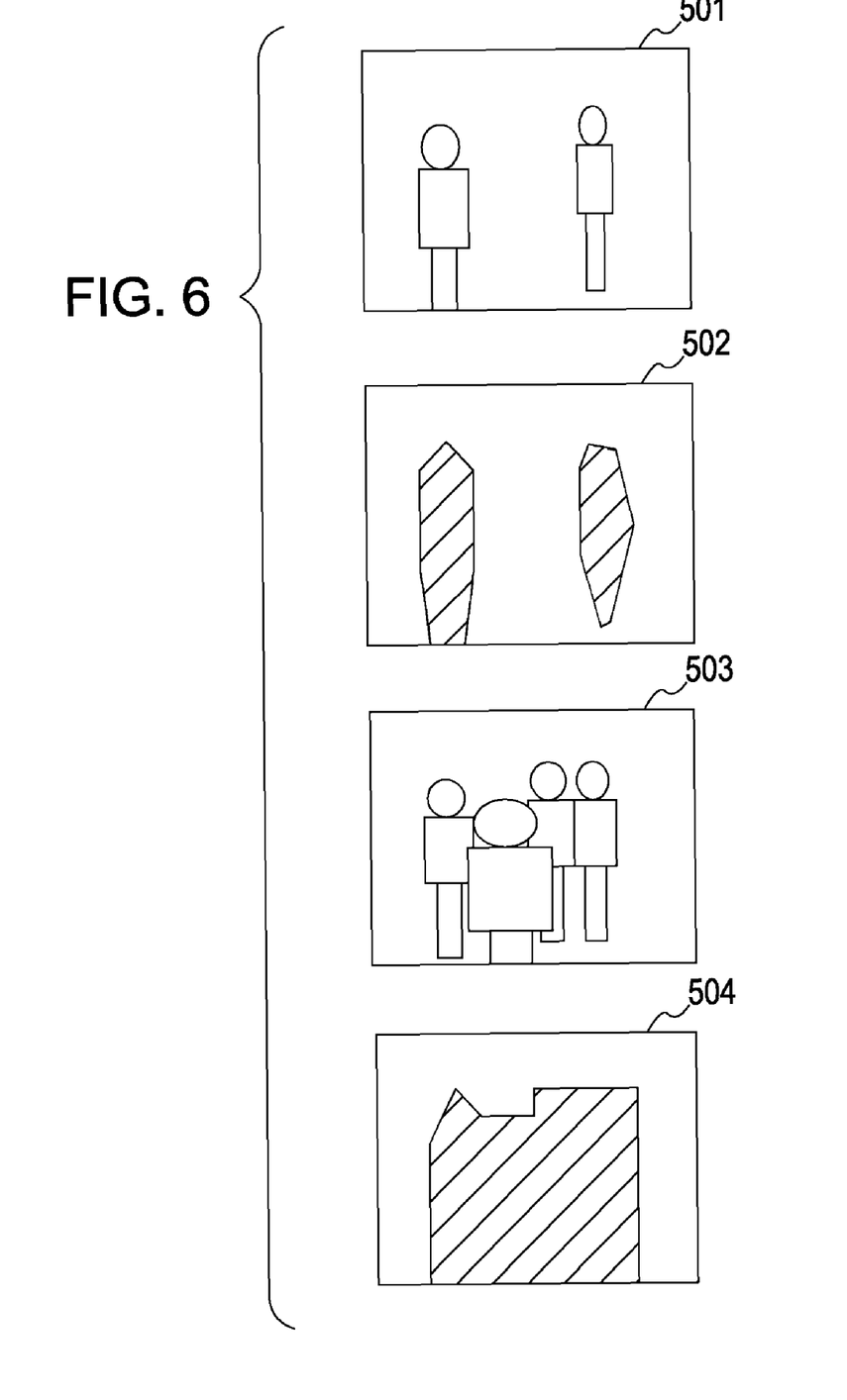
FIG. 6 illustrates a determination process employing background subtraction.

The determination method using background subtraction is used in the present embodiment. For example, the congestion-level determining portion 203 temporarily stores a frame image obtained when no one is on a passage as a background image in the RAM 803. After that, the congestion-level determining portion 203 obtains the difference between the background image temporarily stored in the RAM 803 and a frame image for each frame subjected to detection. FIG. 6 illustrates the determination method employing background subtraction. A frame image 501 is one in which two persons walking separately are seen and corresponds to a state of a "low" level of congestion. A frame image 503 is one in which four clustering persons walking are seen and corresponds to a state of a "high" level of congestion. A resultant image 502 is one in which the congestion-level determining portion 203 obtains the difference between the frame image 501 and the background image, and only the regions of persons (diagonally shaded regions; hereinafter referred to as foreground regions) remain. Similarly, a resultant image 504 is one in which the congestion-level determining portion 203 obtains the difference between the frame image 503 and the background image, and only the region of persons remains as one large foreground region. In such a way, the area of a foreground region obtained from the difference between a frame image and a background image is correlated with the level of congestion.

Utilizing this feature, the congestion-level determining portion 203 determines the level of congestion to be "low" when the total area of the foreground region is smaller than a predetermined value and "high" when it is larger than the predetermined value. When, although a single foreground region is present, the size of the foreground region is larger than the size of a standard person, because there is a high possibility that persons overlap one another, such a case is determined to be a "high" level of congestion. This enables detection with higher accuracy.

The first object detection method is described in detail below.

The first object detection method is a method for detecting an object for use when the level of congestion is "low." In the present embodiment, the first object detection method is a method for detecting an upper body of a person (the details of this process are described below). With this first object detection method, only a person is detectable without confusion with other moving objects, such as a cart. This method can detect an object more stably even if the person looks down or sideways or even for the back of the person, when compared with a method employing face detection. Thus, the detection can be more accurate.

The second object detection method is described in detail below.

The second object detection method is a method for detecting an object for use when the level of congestion is "high." Because the size of an overlap of persons is large when the level of congestion is "high," the detection rate would decrease if an upper body is detected, as in the case where the level of congestion is "low." In the present embodiment, a detection method capable of handling better with an overlap is used as the second object detection method. A first example of such a method is a method employing the face detection and background subtraction. As described above, the face detection is effective for only the IN direction and a face looking to the front. However, when an image is obtained obliquely from above, it is advantageous in that an overlap does not easily occur. Objects in the OUT direction can be estimated on the basis of a foreground region acquired by background subtraction and results of the face detection.

Figure 7:
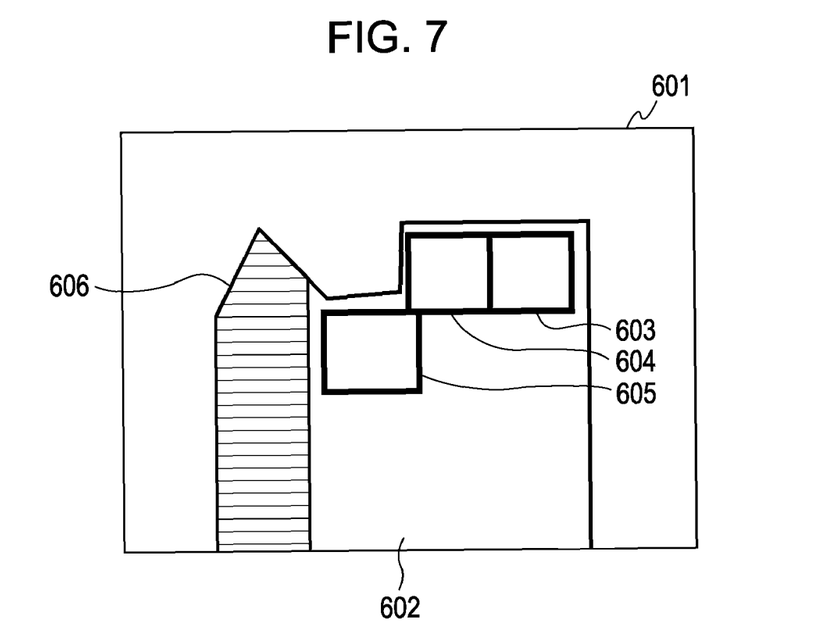
FIG. 7 illustrates an example of a method for detecting an object for use in a second object detecting portion.

FIG. 7 illustrates an example of the second object detection method used by the second object detecting portion 206. A whole frame 601 corresponds to the resultant image 504 illustrated in FIG. 6. A region 602 corresponds to the foreground region (diagonally shaded region) in the resultant image 504 illustrated in FIG. 6. As illustrated in the frame image 503 in FIG. 6, four persons are actually in the region 602; three from the right walk in the IN direction and one walks in the OUT direction. At this time, rectangular regions 603 to 605 are detected by the face detection as regions for faces in the second object detecting portion 206. Because there is a low possibility that a person is present below the faces, the second object detecting portion 206 can determine (detect) a person by dividing a region 606 (indicated by horizontal lines) obtained by subtracting such regions from the foreground region 602 by the size of a standard person.

Another example of the second object detection method is a method employing the face detection and oval edge detection. The second object detecting portion 206 employs the face detection for the IN direction, as described above. The second object detecting portion 206 detects a person by detecting the edge of the back of the head of the person employing oval edge detection. The oval edge detection used herein is the process described below. First, the second object detecting portion 206 finds an edge intensity image using, for example, a Sobel filter from a frame image. Then, the second object detecting portion 206 masks the edge intensity image of a part other than a region that has been subjected to the face detection while changing the size of an oval mask. At this time, if the sum of intensity (enhancement) is equal to or larger than a predetermined value, the second object detecting portion 206 determines that edge to be the edge of the back of the head.

The face detection and upper body detection are described in detail below.

The face detection and the upper body detection are essentially the same. In the following description, in which the face detection is described, if the face is replaced with the upper body, the upper body is detectable.

In the present embodiment, a case is described that uses the method for detecting a face pattern in an image employing neural network-based face detection described in the following document: Rowley et al, "Neural network-based face detection," IEEE TRANSACTIONS ON PATTERN ANALYSIS AND MACHINE INTELLIGENCE, VOL. 20, No. 1, JANUARY 1998.

Figure 8:
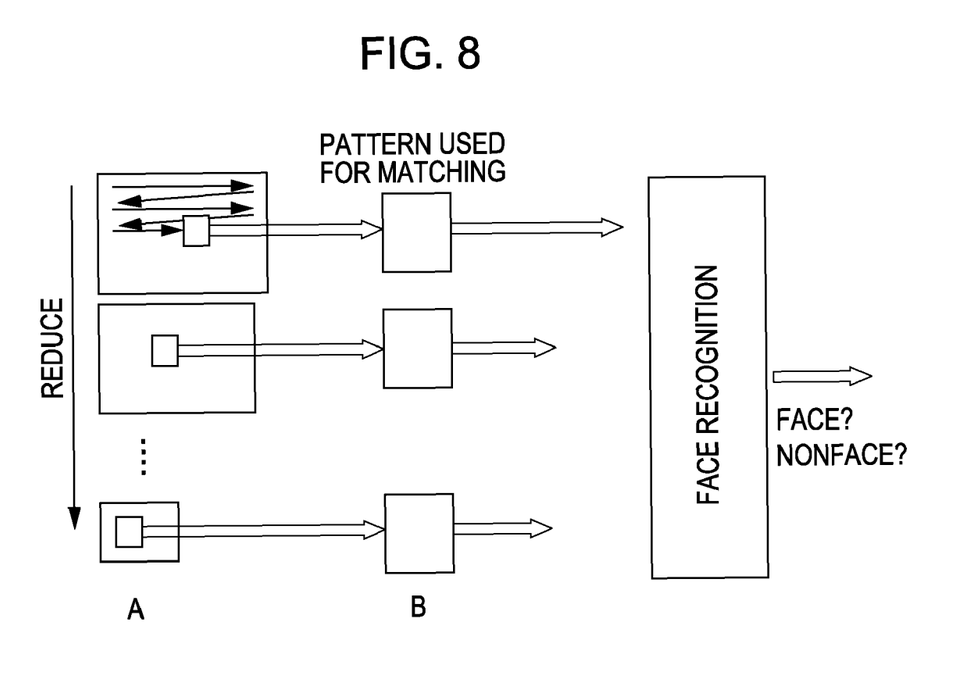
FIG. 8 illustrates an example of face detection.

First, the second object detecting portion 206 reads image data being a target for face detection in a memory and cuts a predetermined region that matches a face from the read image. Then, the second object detecting portion 206 receives the distribution of pixel values of the cut region and obtains a single output by neural network-based computation. At this time, the weight of the neural network and the threshold are learned in advance from many face image patterns and non-face image patterns. The second object detecting portion 206 recognizes a region as a face when the output of the neural network is zero or above; otherwise, the second object detecting portion 206 recognizes it as a nonface. Then, the second object detecting portion 206 scans the face being the output of the neural network and the cut location of an image pattern for use in matching, for example, vertically and horizontally as illustrated in FIG. 8, thus detecting the face from the image. FIG. 8 illustrates an example of the face detection. To deal with various sizes of faces, the second object detecting portion 206 simultaneously reduces the read images, as illustrated in FIG. 8, and performs the above-described scanning for the face detection.

The method for detecting a face from an image is not limited to the above-described neural network-based method. For example, the present invention can use various processes described in the following document: Yang et al, "Detecting Faces in Images: A Survey", IEEE TRANSACTIONS ON PATTERN ANALYSIS and MACHINE INTELLIGENCE, VOL. 24, No. 1, JANUARY 2002.

In the present embodiment, the congestion-level determining portion 203 employs the background subtraction. However, the congestion-level determining portion 203 may obtain a differential image using intra-frame subtraction and determine (assess) the level of congestion on the basis of the area of the differential image. Alternatively, the system illustrated in FIG. 1 may further include a sensor, such as a range sensor or a foot-pressure sensor, and the congestion-level determining portion 203 may determine the level of congestion using the output of such a sensor.

In the present embodiment, the congestion-level determining portion 203 determines the level of congestion from two types of "high" and "low." However, finer classification may be used, for example, using three levels of "high," "middle," and "low." That is, the congestion-level determining portion 203 may classify the level of congestion into any number of types as long as each level of congestion has an appropriate object detection method (or a detecting portion corresponding to an appropriate object detection method).

In the present embodiment, the first object detecting portion 205 corresponds to a "low" level of congestion, whereas the second object detecting portion 206 corresponds to a "high" level of congestion. However, the PC 106 may have a plurality of object detecting portions configured to detect objects contained in a frame image using different detection methods, and the object detection method selecting portion 204 may select a plurality of object detection portions in accordance with the level of congestion. In this case, the PC 106 includes an integrating portion for integrating a plurality of detection results, and the object tracking portion 207 finds a trail of each object being the detection result integrated by the integrating portion within a predetermined period of time.

In the present embodiment, the object detection method selecting portion 204 selects an object detecting portion that will detect an object. However, a plurality of object detecting portions may detect objects at all times, and the object detection method selecting portion 204 may select a result to be used from among the detection results from the plurality of object detecting portions. In this case, after object detection, the level of congestion may be determined and the object detection method (object detecting portion) may be selected.

In the present embodiment, the determination of the level of congestion, object detection, counting and displaying are all made in the PC 106. However, for example, the functional configuration from the congestion-level determining portion 203 to the counting portion 208 may be formed in a chip, and the chip may be integrated into the image pickup portion 104. The PC 106 may receive only a counting result from the image pickup portion 104 through the cable 105 and display the counting result. Alternatively, the first object detecting portion 205 and the second object detecting portion 206 may be integrated into the image pickup portion 104. The PC 106 may receive a result of object detection through the cable 105 and perform the level of congestion determination, and the object detection method selecting portion 204 may select only the use of a detection result.

The present invention can also be achieved by providing a system or a device with a storage medium (or a recording medium) that stores program code (software) implementing the functions of the above embodiment. The central processing unit (CPU or MPU) of the system or the device reads the program code stored in the storage medium and executes it. In this case, the program code itself, which is read from the storage medium, implements the functions of the embodiments mentioned above.

Further, the central processing unit of the system or the device executes the read program code, and the operating system (OS) running on the system or the device may carry out actual processing in part or in entirety in accordance with instructions of the program code. A case where that processing implements the functions of the above embodiment is included.

The program code read from the storage medium may be written in a memory provided in a function expansion board inserted in a computer or a function expansion unit connected to the computer. After that, a CPU and the like provided in the function expansion board or the function expansion unit carries out a part of or all of the processing.

In a case where the present invention is applied to the storage medium, that storage medium stores program code corresponding to the previously described flowchart.

With the above-described embodiment, even when objects tend to overlap one another, the objects can be detected and the number of the objects can be counted with high precision.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-052104 filed Mar. 3, 2008, which is hereby incorporated by reference herein in its entirety.

What is claimed is:

1. An image processing apparatus comprising:
 a first detecting units configured to detect an object based on an upper body of a person;
 a second detecting unit configured to detect an object based on a face of a person;
 a determining unit configured to determine a level of congestion of objects contained in an input image;
 a selecting unit configured to select at the first detecting unit when the determined level of congestion is low and selecting the second detecting unit when the determined level of congestion is high; and
 a control unit configured to cause a result of detection of an object from the input image detected by the selected detecting unit to be output.

2. The image processing apparatus according to claim 1, wherein the control unit is configured to cause only the selected detecting unit to detect the objects from the input image.

3. The image processing apparatus according to claim 1, wherein the control unit is configured to cause the first and second detecting units to detect the objects contained in the input image and cause the result of detection of the object detected by the detecting unit selected by the selecting unit to be selected and output.

4. The image processing apparatus according to claim 1, further comprising a counting unit configured to count a number of objects detected by the detecting unit selected by the selecting unit.

5. The image processing apparatus according to claim 4, further comprising an object tracking unit configured to find a trail of the object from the detection within a predetermined period of time, the detection being performed by the detecting unit selected by the selecting unit,
wherein the counting unit is configured to count a number of objects whose trails found by the object tracking unit satisfy a predetermined condition.

6. The image processing apparatus according to claim 4, further comprising a display unit configured to display the number of objects counted by the counting unit.

7. The image processing apparatus according to claim 1, further comprising an image pickup unit configured to obtain an image.

8. The image processing apparatus according to claim 1, wherein the determining unit is configured to obtain a difference between the input image and a background image and determine the level of congestion based on the obtained difference.

9. The image processing apparatus according to claim 1, wherein the second detecting unit is configured to detect the object based on the face of the person and a difference between the input image and a background image.

10. The image processing apparatus according to claim 1, wherein the second detecting unit is configured to detect the object based on the face of the person and an oval edge.

11. An image processing method comprising:
determining a level of congestion of objects contained in an image;
selecting a first detection process when the determined level of congestion is low and selecting a second detection process when the determined level of congestion is high, wherein the first detection process detects an object based on an upper body of a person and the second detection process detects the object based on a face of a person; and
detecting the object from the image using the selected detection process.

12. A non-transitory computer-readable storage medium that stores a program for instructing a computer to implement the image processing method according to claim 11.

* * * * *